July 22, 1924.
F. N. SPRAGUE
1,502,595
COMBINED STABILIZER AND SHOCK ABSORBER
Filed April 14, 1923
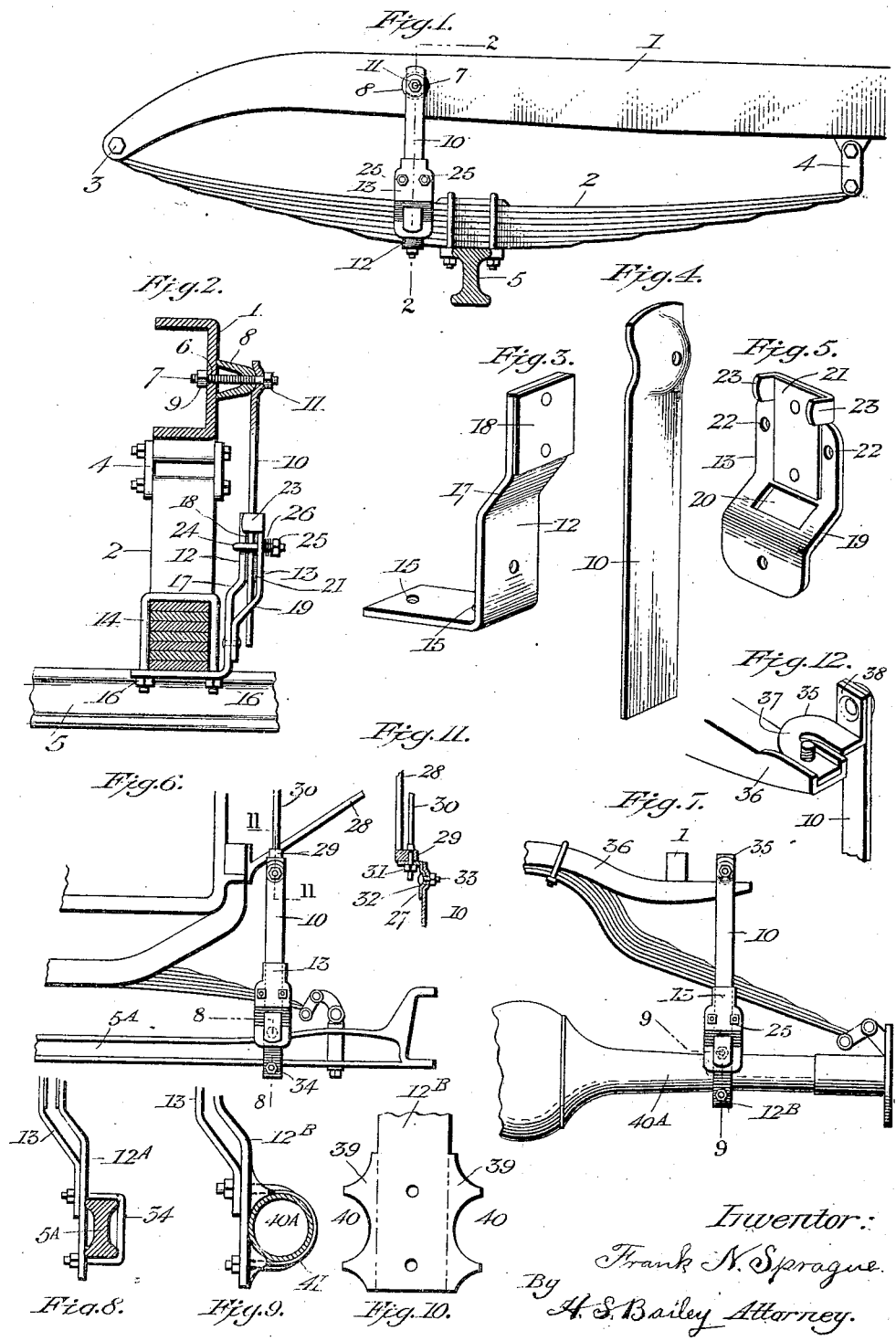

Patented July 22, 1924.

1,502,595

UNITED STATES PATENT OFFICE.

FRANK N. SPRAGUE, OF HOLYOKE, COLORADO.

COMBINED STABILIZER AND SHOCK ABSORBER.

Application filed April 14, 1923. Serial No. 632,023.

*To all whom it may concern:*

Be it known that I, FRANK N. SPRAGUE, a citizen of the United States of America, residing at Holyoke, county of Phillips, and State of Colorado, have invented a new and useful Combined Stabilizer and Shock Absorber, of which the following is a specification.

My invention relates to improvements in combined stabilizers and shock absorbers for automobiles and like vehicles.

The object of the invention is to provide a device of this character, which is adapted to be used in connection with either the side spring or end spring type of automobile, and which can be regulated to offer such resistance to shocks, as the load and spring conditions may require.

Further, to provide a stabilizer and shock absorber for automobiles, comprising a blade-like member which is secured to the frame of the automobile, and members which are secured to the axle or to the spring and which exert a resilient clamping pressure on the blade member, whereby shocks due to violent compression and rebound of the springs are absorbed through the frictional sliding engagement of the co-acting members of the absorber, which retard both the drop of the car body and the succeeding rebound of the springs, means being provided to vary the clamping pressure upon the said blade member.

Further, to provide a stabilizer and shock absorber which is both simple and inexpensive, and which can be applied to either the side spring or the end spring style of car without change in the existing construction of the said cars.

These objects are accomplished by the mechanism illustrated in the accompanying drawings, in which:

Figure 1 is a side view illustrating the application of the improved device to the front end of a side spring form of automobile, the spring, and a portion only, of the automobile being shown.

Fig. 2 is a vertical sectional view—enlarged—on the line 2—2 of Figure 1.

Figures 3, 4 and 5 are perspective views of the different members of the shock absorber.

Fig. 6 is a front view of a portion of the front end of an end spring style of car, showing the application of the improved shock absorber thereto.

Fig. 7 is a view of a portion of the rear end of an end spring style of car, showing the manner of applying the device to this end of the car.

Fig. 8 is an enlarged vertical sectional view on the line 8—8 of Figure 6.

Fig. 9 is an enlarged vertical sectional view on the line 9—9 of Figure 7.

Fig. 10 is a view of a portion of the blank from which the member shown in Figure 9 is made.

Fig. 11 is a sectional view on the line 11—11 of Fig. 6, and

Fig. 12 is a perspective view of one end of the cross bar shown in Figure 7, showing the manner of connecting the upper member of the shock absorber thereto.

Referring to the accompanying drawings:

The numeral 1 indicates the front end portion of the side bar of an automobile and 2 a common type of semi-elliptic side spring which is secured at its forward end to a bolt 3 which extends through the front end of the side bar, and at its rear end to a shackle 4 which is pivotally secured to the said side bar, the spring being secured intermediate of its length to the forward axle 5, in the usual manner.

A threaded aperture 6 is formed in the side bar and receives a stud bolt 7, upon which is screwed a knob-like member 8 which bears against the outer face of the side bar, one end of the stud bolt extending through and beyond the knob 8. The bolt 7 is held against turning by a nut 9, which is screwed upon the inner end of the bolt and against the inner face of the side bar.

Upon the extended end of the stud bolt 7 is mounted the upper end of a thin metal blade 10, which tapers in thickness toward its lower end, its upper end being concavo-convex to conform to the end of the knob 8, against which it is held by a nut 11, which is screwed upon the outer end of the stud bolt.

The lower portion of the blade 10 is resiliently clamped between two friction clamp plates 12 and 13, which are arranged and supported as follows: The plate 12 is substantially L-shaped in edge view, and its base or foot portion extends under and against the bottom leaf of the side spring 2 and is rigidly secured thereto by a U-bolt 14, which straddles the spring, its end portions passing through holes 15 in the said base portion, and receiving nuts 16 which are screwed against the base portion, thereby clamping the same against the bottom leaf of the spring 2. The vertical member of the plate 12 is given a slight outward bend midway of its length, as shown at 17, by which the upper half of the vertical member is offset or out of vertical line with its lower half, and a wear plate 18 is riveted to the outer face of the said offset portion. To the lower portion of the vertical member of the plate 12 is either riveted or bolted the lower end portion of the clamp plate 13, and this plate is also given an outward bend 19, corresponding to the bend 17 on the other plate, which positions the upper portion of the plate out of vertical line with its lower portion, the upper portion of the two plates being parallel and separated by only a slight space. The plate 13 is slightly wider than the plate 12, which is of the same width as the blade 10, and the outwardly bent portion 19 is provided with a rectangular aperture 20. This plate is also provided with a wear plate 21 and with holes 22 which are located adjacent its side edges and between the bend 19 and the upper edge of the plate, and inwardly projecting guide ears 23 are also formed on the upper corner portions of this plate, which overlie the side edges of the plate 12, as clearly shown in Figure 2.

The blade 10 extends down between the plates 12 and 13, and through the aperture 20 in the plate 13, and the plates 12 and 13 are held in frictional engagement with the said blade 10, by a U-bolt 24, the members of which straddle the plate 12, and pass through the holes 22 in the plate 13, and receive nuts 25, between which and the plate 13, are interposed coil springs 26, which surround the bolt members and which are compressed between the nuts 25 and the plate, when the nuts are screwed upon the bolt, thereby resiliently clamping the plates 12 and 13 upon the opposite sides of the blade 10.

It will thus be seen that upon either the compression or rebound of the spring 2, the blade 10 is caused to slide between the plates 12 and 13, or rather between the wear plates 18 and 21 on the said plates, but that the frictional engagement of the said wear plates with the opposite sides of the blade 10 will so retard the movement of the said blade as to prevent the too sudden drop or rebound of the vehicle body, and the consequent jolt or shock to the occupants thereof. As the thickness of the blade 10 diminishes toward its lower end, the downward movement of the said blade will gradually spread the plates 12 and 13, thus increasing the tension on the springs 26, and thereby also increasing the frictional resistance between the said plates and the blade by which the drop of the car body is more gradually and more effectively checked.

In Figure 6 I have shown the manner of securing the improved device to the front end of a "Ford" car. In this arrangement, the blade 10 is bolted at its upper end to an L-shaped bracket 27, which is secured to the fender supporting rod 28, in the following manner. These supporting rods 28 are provided with apertured lugs 29, through which the lower ends of the head-light brackets or rods 30 pass, and also through the horizontal members of the brackets 27, which are apertured, and rest against the under sides of the said lugs 29, and are clamped there-against by nuts 31, which are screwed upon the ends of the said brackets or rods 30. The vertical member of the bracket 27 is formed with a concavo-convex protuberance 32, to coincide with the correspondingly formed end of the blade 10, and a bolt 33 secures these parts together. In this arrangement, a clamping plate 12$^A$ is used instead of the plate 12, and the plate 12$^A$ is similar to the plate 12, only the base portion thereof is omitted, and the vertical portion thereof is secured to the front axle 5$^A$ by a U-bolt 34, which straddles the axle, its ends passing through holes in the said plate 12$^A$ and receiving nuts which clamp the plate against the axle, as clearly shown in Figure 8. In other respects, this form of the device is identical with the form shown in Figures 1 to 5 inclusive.

In order to secure this device to the rear end of a "Ford" car, as shown in Figure 7, I employ a bracket 35, which is secured to the end of the usual rear cross bar 36, this bracket being of the form shown in Figure 12, and comprising a U-shaped member 37, which rests upon and is bolted to the end of the cross bar, and an upright member 38, to which the upper end of the blade 10 is bolted, the member 38 also being formed to coincide with the concavo-convex end of the said blade. In the arrangement, a clamp plate 12$^B$ takes the place of the plate 12 shown in Figures 2 and 3, and the lower end of this plate 12$^B$ is formed with lateral projections 39, having semi-circular recesses 40, and the projections 39 are bent over at right angles along the dotted lines shown in Figure 10, so that the semi-circular recesses will be in position to receive the rear axle 40$^A$ to which this end of the plate 12$^B$ is secured by a U-bolt 41, as shown in Figure 9, the bow of said U-bolt being preferably flat and wide in order to better grip the said axle when bolted thereto. In other respects, this form, also, is identical with the form shown in Figures 1 to 5.

The device above described not only provides a simple, effective and inexpensive shock absorber, but it also acts as a means to stabilize or steady the drop and rebound of the car body, by causing said body to move in a practically vertical direction, whether on the drop or the rebound. By properly adjusting the nuts 25, the tension on the springs 26 may be either increased or diminished to vary the frictional resistance of the plates 12 and 13, with respect to the blade 10 to meet the load condition of the car, and the manner of securing the upper end of blade 10, permits a slight slipping movement of this end of the blade with respect to the bolt 7, under any strain which would tend to move the blade out of vertical line.

Having described my invention, what I claim as new and desire to secure by Letters Patent, is:

1. In a device of the character described, the combination with an automobile frame and axle, of a depending blade-like member secured at its upper end to said frame, parallel plates secured to said axle and adapted to receive between them the lower portion of said blade, a U-shaped bolt the members of which pass around one of said plates and through the other plate, nuts on said bolt members, and coil springs interposed between said nuts and the adjacent plate, whereby the said plates are caused to engage the said blade with a resilient pressure.

2. In a device of the character described, the combination with an automobile frame and axle, of a blade secured at its upper end to said frame by a single bolt, plates secured to said axle having parallel offset portions between which the lower portion of said blade passes, wear plates on said offset portions, a U-bolt the members of which pass around one of said plates and through the other plate, nuts on the end portions of said bolt and coil springs interposed between said nuts and the adjacent plate, whereby the said plates are caused to clamp the blade with a resilient pressure.

3. In a device of the character described, the combination with a frame and axle of an automobile, of a blade secured at its upper end to said frame, and which diminishes in thickness towards its lower end, a plate secured to said axle, a second plate secured to the first plate, said plates having angular bends intermediate of their lengths to provide offset portions which are parallel, said second plate having a slot in its angular bent portion, said blade extending between said parallel portions and through the slot in the said second plate, and means for clamping said parallel portions against the opposite sides of said blade with a resilient pressure.

4. In a device of the character described, the combination with the frame and axle of an automobile, of a member secured to said frame having a rounded protuberance, a blade the upper end of which is formed to fit said rounded protuberance and which is movably secured thereto, a plate having curved recessed portions which engage said axle, a second plate, a U-bolt which extends around said axle and through said plates and nuts thereon for clamping said plates to said axle, said plates having angular bent portions midway of their lengths to provide offset portions which are parallel, said parallel portions having wear plates and said second plate having a slot in its bent portion, said blade extending between said plates and through the slot in said second plate, and means for clamping said plates against said blade with a resilient pressure.

5. In a device of the character described, the combination with an automobile frame and axle, of spaced parallel plates secured to said axle, one of which is wider than the other and is provided with ears upon its upper corners which overlie the edges of the narrower plate, a blade secured at its upper end to said frame and extending between said plates, and a U-bolt which extends around one of said plates and through the other plate and having nuts on its ends and coil springs interposed between said nuts and the adjacent plate, whereby said plates are caused to clamp said blade with a resilient pressure.

6. A combined stabilizer and shock absorber for automobiles, comprising a blade, and plates having parallel offset portions between which the lower portion of said blade passes, wear plates in said offset portions, a U-bolt, the members of which pass around the offset portion of one of said plates and through the offset portion of the other plate, nuts on the end portions of said bolt, and coil springs on the members of said bolt interposed between said nuts and the adjacent plate, whereby said plates are caused to clamp the blade with a resilient pressure.

In testimony whereof I affix my signature in presence of two witnesses.

FRANK N. SPRAGUE.

Witnesses:
F. G. FIEDLER,
C. E. PAUL.